Jan. 20, 1931.  R. W. MUELLER  1,789,878
DRILLING VALVE
Filed April 5, 1923  2 Sheets-Sheet 2
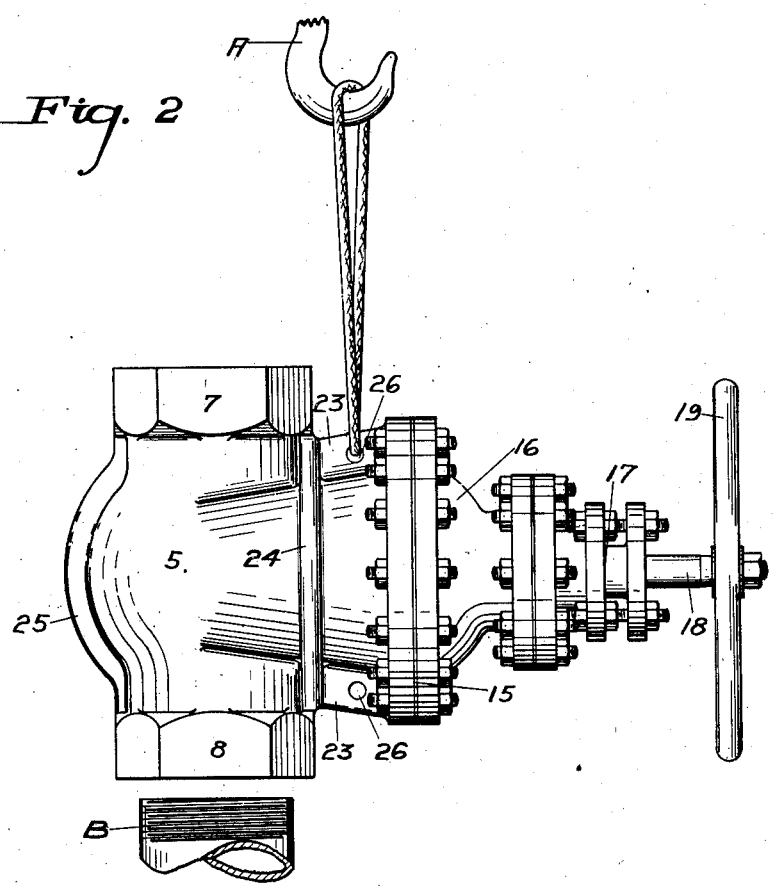
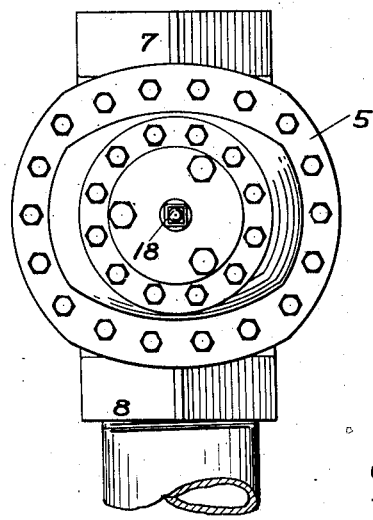
INVENTOR
R. W. Mueller
BY
W. G. Doolittle
ATTORNEY Patented Jan. 20, 1931

1,789,878

UNITED STATES PATENT OFFICE

RICHARD W. MUELLER, OF PITTSBURGH, PENNSYLVANIA, ASSIGNOR TO KEROTEST MANUFACTURING COMPANY, OF PITTSBURGH, PENNSYLVANIA, A CORPORATION OF PENNSYLVANIA

DRILLING VALVE

Application filed April 5, 1923. Serial No. 630,051.

This invention is for an improved valve, and relates particularly to large heavy valves especially designed for use at the top of a well casing, the valve being designed to permit of the passage of drilling tools therethrough.

Valves for this purpose must be designed to resist extremely high pressures. They must also be so designed that the passage of drilling tools therethrough will not injure or score the valve seats, and the valve seats should be so arranged that they will not be apt to be scored by grit or sand.

Because of the enormous weight of such valves, considerable difficulty has heretofore been encountered in placing the valves on the top of the casing.

The present invention, which relates to the class of valves described in my Patent No. 1,526,486 of February 17, 1925, has for its principal objects to provide a valve for this purpose which may be easily manipulated in the field, and in which the seat is well protected from damage.

The invention may be readily understood by reference to the accompanying drawings, in which:

Fig. 2 is a side elevation showing the manner in which the valve may be handled to bring it into position;

Fig. 3 is an elevation of the valve, with the hand wheel removed.

Figure 1:
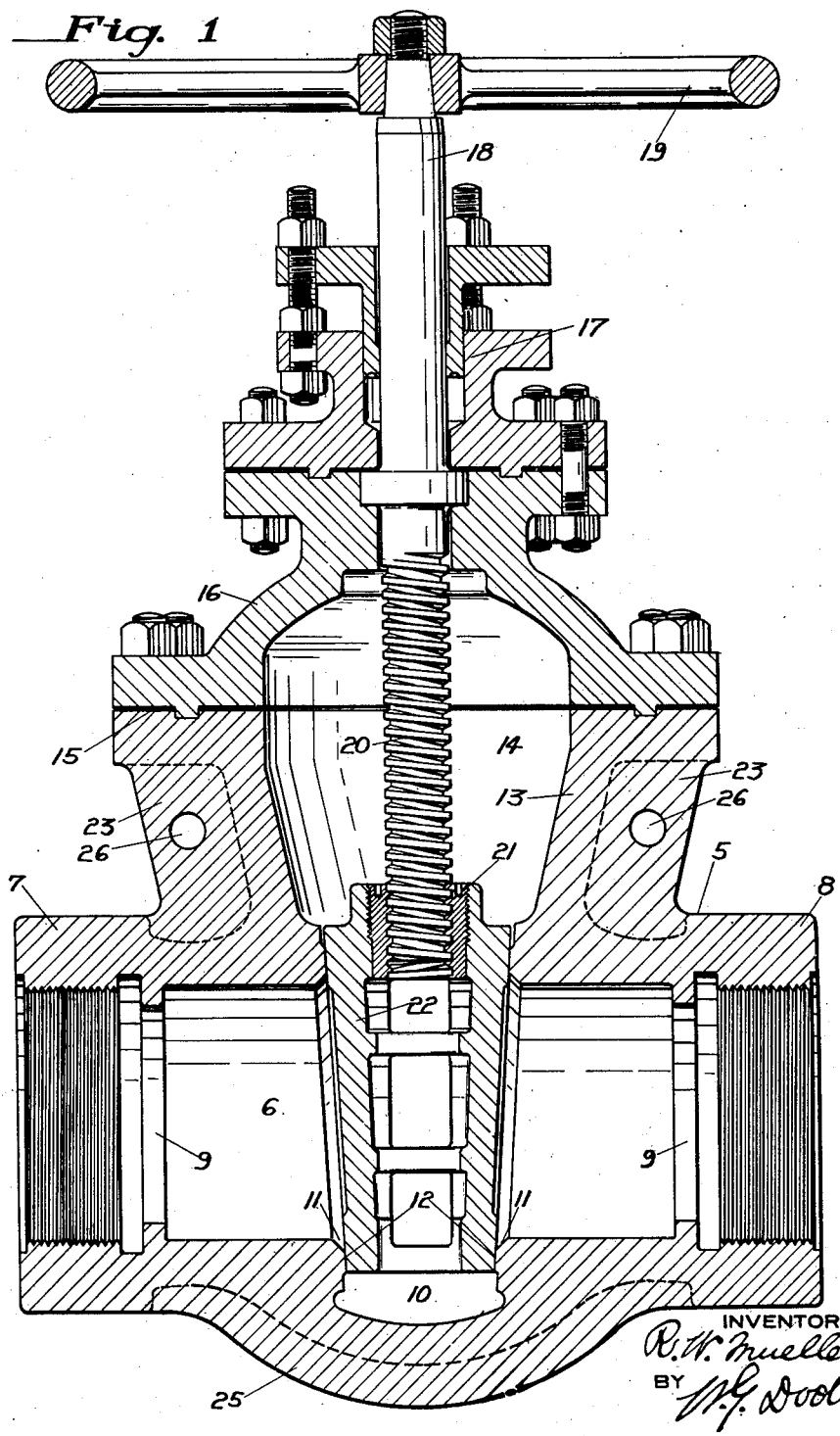
Fig. 1 is a longitudinal section through the valve.

In the drawing, 5 designates the valve body having a straight passage 6 therethrough. At each end of the body are end portions 7 and 8 which are interiorly threaded. In the passageway, near the threaded parts thereof, are annular shoulders 9 which are of a height substantially equal to the thickness of the pipe to be threaded into the valve. These shoulders provide a bearing or guiding surface for the drilling tools passing through the valve when it is in position.

In the central part of the body is an annular enlargement 10 of the passage. Formed in the passage in the side walls of the annular enlargement are beveled faces 11 which terminate at the integral seats 12. These seats are set well back from the passageway, as clearly shown in Fig. 1.

The beveled surfaces tend to guide the end of a tool or other object passing through the valve into a central position and thereby protect the valve seats. If a sharp corner were provided instead of a beveled face, this corner might easily become mutilated by the passage of tools through the valve. The mutilated surface would score the gate and damage the valve.

Formed integrally with the valve body are walls 13 which enclose a valve receiving chamber 14, the enlargement 10 opening into this chamber to permit of the reciprocation of the valve element or gate hereinafter described.

The walls of the chamber slope outwardly and are so shaped that the chamber is somewhat oval-shaped, with the longer axis thereof being transverse to the longitudinal axis of the valve body.

Secured to the flat top 15 of the walls is a hood 16 carrying a packing gland 17 through which passes valve stem 18. The outer end of the valve stem carries a hand wheel 19 and the inner part is threaded, as indicated at 20.

Threaded onto the lower end of the shaft or stem is a bushing 21 of a hollow gate 22. Upon rotation of the valve stem, the hollow valve may be reciprocated, as will be readily understood.

In order that the valve may have a maximum strength with a minimum weight, bracing ribs are used at advantageous points, which enable the thickness of the walls at other points to be reduced.

As the tendency of gas pressure in chamber 14 is to round the chamber out, integral plate-like webs 23 are formed outside the walls 13 which extend parallel with the longitudinal axis of the valve. It will be noted that the said webs 23 are thus integral with the body of the valve along lines surrounding the apertures or holes 26 having terminals extending outwardly beyond such holes. At 24 is an annular bracing rib and at 25 is a rib extending substantially the length of the valve body.

When the valves are in use, the passageway is in a vertical position. Heretofore, considerable difficulty has been met in manipulating the valve to screw it onto the casing. According to the present invention, a hole 26 is formed in one or both webs 23. The hole, when properly positioned, is close to the center of balance of the valve when suspended from a rope or chain passed therethrough, as shown in Fig. 2. By turning the hand wheel, the valve element may be shifted to exactly balance the valve when suspended. It can then be easily manipulated by one man when lowered by means of a hook A (see Fig. 2) to properly engage the top of the well casing B.

This is an extremely important advantage. It will be noted that, while a means of suspension is thus provided, the valve is not weakened at any point and it is not necessary to tap into the walls of the valve or chamber.

I claim as my invention:

A gate valve comprising a body having a passageway therethrough, a gate reciprocable across the passageway, said passageway being recessed where the gate is adapted to slide, valve seats set inwardly from the passageway, inclined surfaces leading from the passageway back to the seats, and means in said passageway in advance of the seats extending out from the walls thereof which serve to guide drilling tools which may be passed through the valve.

In testimony whereof I affix my signature.

RICHARD W. MUELLER.